US 6,437,740 B1

(54) SINGLE RECEIVER WIRELESS TRACKING SYSTEM

(75) Inventors: Brian De Champlain, Waterloo; Frank Gerlach, Mississauga, both of (CA)

(73) Assignee: Stelx, Inc., Toronto (CA)

( * ) Notice: Subject to any disclaimer, the term of this patent is extended or adjusted under 35 U.S.C. 154(b) by 3 days.

(21) Appl. No.: 09/618,483

(22) Filed: Jul. 18, 2000

Related U.S. Application Data

(63) Continuation of application No. PCT/CA00/00439, filed on Apr. 27, 2000.
(60) Provisional application No. 60/131,143, filed on Apr. 27, 1999.

(51) Int. Cl.$^7$ ................................................. G01S 5/02
(52) U.S. Cl. ....................... 342/417; 342/422; 342/423; 342/153
(58) Field of Search .............................. 342/417, 422, 342/423, 153; 455/73, 456

(56) References Cited

U.S. PATENT DOCUMENTS

| | | | |
|---|---|---|---|
| 3,846,799 A | 11/1974 | Guegen | 343/833 |
| 4,700,197 A | 10/1987 | Milne | 343/837 |
| 4,742,357 A | 5/1988 | Rackley | 342/457 |
| 5,374,932 A | 12/1994 | Wyschogrod et al. | 342/36 |
| 5,525,967 A | 6/1996 | Azizi et al. | 340/573 |
| 5,859,879 A * | 1/1999 | Bolgiano et al. | 375/347 |
| 6,167,266 A * | 12/2000 | Havinis et al. | 455/433 |

FOREIGN PATENT DOCUMENTS

| | | | |
|---|---|---|---|
| EP | 0 098 160 | 1/1984 | G01S/13/76 |
| EP | 0 671 635 | 9/1995 | G01S/13/28 |
| GB | 2 062 395 | 5/1981 | G01S/13/76 |
| WO | WO 99/09650 | 2/1999 | G01S/13/00 |

* cited by examiner

*Primary Examiner*—Theodore M. Blum
(74) *Attorney, Agent, or Firm*—Katten Muchin Zavis Rosenman

(57) ABSTRACT

A wireless tracking system consists of a wireless target including a wireless communication system for transmitting a data packet over a communication path, and a locating station for determining a position of the target. The data packet transmitted from the target includes an identification code uniquely associated with the target. The locating station includes a configurable directional antenna, a communication interval processing system, a direction processing system, and a position processing system. The communication interval processing system is in communication with the directional antenna and determines the transmission interval of the transmitted data packet over the communication path. The direction processing system determines the transmission angle of the communication path, and is in communication with the directional antenna for controlling the configuration of the directional antenna so as to facilitate the determination of the transmission angle. The position processing system is in communication with the interval processing system and the direction processing system, and determines the target position from the identification code, the transmission interval and the transmission angle.

18 Claims, 12 Drawing Sheets

SINGLE RECEIVER WIRELESS TRACKING SYSTEM

This application claims benefit of Ser. No. 60/131,143 Apr. 27, 1999and a continuation of PCT/ CA00/00439 Apr. 27, 2000.

FIELD OF THE INVENTION

The present invention relates to a target tracking system. In particular, the present invention relates to a single receiver wireless locating and tracking system.

BACKGROUND OF THE INVENTION

Wireless locating and tracking systems are often used to identify the location of a target object. Conventional wireless locating systems typically employ two or three wireless receivers positioned at known co-ordinates for the identification a target object's location. For instance, two-dimensional global positioning systems (GPS) employ three satellites which transmit their respective co-ordinates and transmission times to a GPS receiver. Typically, additional satellite are used for redundancy purposes, to increase accuracy and for three-dimensional imaging. The GPS receiver receives the transmitted information, and then determines its position from the transmitted co-ordinates and from the transmission interval of the wireless transmissions from the satellites to the GPS receiver. Signal strength locating systems typically employ two wireless receivers positioned at known co-ordinates for receiving wireless transmissions from a wireless transmitter. The co-ordinates of the wireless transmitter, relative to the wireless receivers, are calculated from the signal strength of the wireless transmission received at each receiver. Although both forms of locating systems, particularly signal strength locating systems, are widely used, they suffer from a number of deficiencies.

For instance, GPS satellites intermittently transmit erroneous information to the GPS receivers. Although military users of GPS receivers are provided with an encryption key for identifying and removing the erroneous information, the encryption key is not available to non-military GPS users. As a result, GPS systems do not provide non-military GPS users with particularly accurate co-ordinate identification. Further, triangulation by RF signal strength is limited by the effects of co-channel interference, multi-path distortion, tropospheric scatter, phase distortion and signal phase cancellation. Additionally, the multiple satellites/receivers required of both forms of wireless systems constitute significant barriers to market entry. Attempts have been made to improve upon the conventional wireless locating systems.

For example, Jarvis (U.S. Pat. No. 3,665,312) teaches a wireless locating system comprising a multiple frequency wireless transmitter, an entry detector for activating the wireless transmitter upon detection of unauthorized entry, and a plurality of directional receivers. Once unauthorized entry is detected, the wireless transmitter transmits a unique coded signal to the directional receivers for co-ordinate identification using signal triangulation. To thwart jamming of the wireless transmitter, the transmitter sequentially shifts its transmission frequency at predetermined time intervals. However, Jarvis is limited by the need for multiple directional receivers.

Regan (U.S. Pat. No. 4,177,466 assigned to Lo-Jack Corporation) teaches an auto theft detection system comprises a wireless transceiver configured with the vehicle identification number of the vehicle in which the transceiver is fitted, and a plurality of mobile radio direction finders for determining the direction of a transmission from the target transceiver. If the vehicle fitted with the target transceiver is reported stolen, a transmitter station transmits a continuous locator signal encoded with the vehicle identification number assigned to the subject transceiver. Upon receipt of the continuous locator signal, each transceiver decodes the signal to determine whether the transmitted vehicle identification code matches its assigned vehicle identification number. The transceiver having the matching vehicle identification number transmits a responsive output signal which the radio direction finders use to triangulate on the subject vehicle. Although the use of multiple mobile radio direction finders reduces the sensitivity of the system to co-channel interference, multi-path distortion, phase distortion and signal phase cancellation, the system can be defeated by jamming the transmission of the wireless transmitter with an RF transmitter tuned to the appropriate transmitting frequency. Further, recourse to multiple mobile direction finders unnecessarily increases the cost of locating a stolen vehicle.

Rackley (U.S. Pat. No. 4,742,357) teaches a vehicle locating system comprising a target wireless transceiver configured with the vehicle identification number of the vehicle in which the transceiver is fitted, and a single conventional directional receiver for receiving a transmission from the target transceiver. Each wireless transceiver is capable of operating in a direction-triangulation mode, a distance-triangular mode, a distance-direction mode, and long range navigation (LORAN) mode. If the vehicle fitted with the target transceiver is reported stolen, a base station transmits to the target transceiver a data packet containing the subject vehicle's vehicle identification number, a location mode code identifying distance-direction mode as the operating mode for the transceiver, and a code identifying the transmission frequency at which transceiver is requested to transmit. Upon receipt of the base station message, the transceiver configured with the subject vehicle identification number activates its echo channel. The base station then transmits an echo pulse to the transceiver and activates a timer. After the transceiver receives the echo pulse, it returns the echo pulse back to the directional receiver through the echo channel, after a precise fixed delay. The directional receiver calculates the distance of the vehicle relative to the receiver from the propagation delay of the echo pulse, after subtracting the fixed delay of the transceiver. Simultaneously, the directional receiver measures the angle of transmission of the echo pulse from the transceiver, and converts the calculated range and angle measurements to map coordinates. Although Rackley is advantageous in that it only requires a single directional receiver, the need for the wireless transceiver to operate in a number of different operation modes increases the cost and complexity of each transceiver. Further, as the delay of the transceiver can vary with temperature and humidity, the accuracy of the calculated co-ordinates is limited. In addition, the use of a single conventional directional receiver exposes the locating system to further inaccuracy from multi-path distortion, signal phase cancellation, and ambient noise.

Therefore, there remains a need for a target tracking and locating system which does not rely on a plurality of wireless directional receivers for accurate target co-ordinate location. Further, there remains a need for a target tracking and locating system whose accuracy is not sensitive to RF jamming, multi-path distortion and changes in environmental conditions.

SUMMARY OF THE INVENTION

According to a first aspect of the present invention, there is provided a single receiver wireless tracking system which addresses deficiencies of the prior art wireless target tracking and locating systems. The wireless tracking system includes a wireless target including a wireless communication system for transmitting a data packet over a communication path, and a locating station for determining a position of the target. The data packet transmitted from the target includes an identification code uniquely associated with the target. The locating station includes a configurable directional antenna, a communication interval processing system, a direction processing system, and a position processing system. The communication interval processing system is in communication with the directional antenna and determines the transmission interval (elapsed transmission time) of the transmitted data packet over the communication path. The direction processing system determines the transmission angle (angular direction) of the communication path, and is in communication with the directional antenna for controlling the configuration of the directional antenna so as to facilitate the determination of the transmission angle. The position processing system is in communication with the interval processing system and the direction processing system, and determines the target position from the identification code, the transmission interval and the transmission angle.

In accordance with the first aspect of the invention, there is also provided a method for locating a target which includes the steps of (1) configuring a configurable directional antenna for determining a transmission interval and a transmission angle of a data packet transmitted from a target over a communication path; (2) receiving the data packet with the configured directional antenna, the received data packet including an identification code uniquely associated with the target; (3) determining the transmission interval and the transmission angle of the received data packet; and (4) determining a position of the target from the identification code, the transmission interval and the transmission angle.

According to a second aspect of the invention, there is provided a wireless locating station for determining a position of a target, which addresses deficiencies of the prior art wireless locating stations. The wireless locating station includes a configurable directional antenna for receiving over a communication path a data packet from the target, a communication interval processing system in communication with the directional antenna, a direction processing system in communication with the directional antenna, and a position processing system in communication with the interval processing system and the direction processing system. The data packet transmitted from the target includes an identification code uniquely associated with the target. The communication interval processing system determines the transmission interval of the transmitted data packet over the communication path. The direction processing system determines the transmission angle of the communication path, and controls the configuration of the directional antenna so as to facilitate the determination of the transmission angle. The position processing system determines the target position from the identification code, the transmission interval and the transmission angle.

According to a third aspect of the invention, there is provided a wireless target for use with a wireless locating station for identifying a position of the wireless target, which addresses deficiencies of the prior art wireless targets The wireless target includes a data transceiver for transmitting a data packet over a communication path, and a loop-through system in communication with the data transceiver for transmitting the data packet in response to a data key received from the locating station. The loop-through system includes a propagation delay processing system for determining the propagation delay through the target and for providing the locating station with an indication of the identified propagation delay.

According to a fourth aspect of the invention, there is provided a configurable directional antenna which addresses deficiencies of the prior art antennae. The configurable directional antenna includes a centre antenna element, and a plurality of second antenna elements disposed about the centre antenna element. Each second antenna element defines, together with the centre antenna element, an antenna sector which facilitates communication of electromagnetic energy. The configurable directional antenna also includes a switch matrix for altering a configuration of each antenna sector.

In accordance with a preferred embodiment of the invention, the locating station includes a data transmitter for transmitting to the target a data key uniquely associated with the target, and a data receiver for receiving the data packet from the target in response to the data key. The communication interval processing system of the locating station includes an interval counter in communication with the data transmitter and the data receiver. The wireless communication system of each wireless target includes a data transceiver, and a loop-through system in communication with the data transceiver for transmitting the data packet in response to the data key received from the locating station. The loop-through system includes a propagation delay processing system for determining a propagation delay through the target and for providing the data packet with a data field identifying the propagation delay. The communication interval processing system determines the transmission interval between the target and the locating station in accordance with the propagation delay, a transmit time of the data key, and a receipt time of the data packet.

The loop-through system of the wireless target also includes a reference clock for clocking the data packet through the data transceiver, and a symbol correlator coupled to the reference clock and the data transceiver for receiving a clock synchronization symbol from the locating system. The symbol correlator synchronizes the clocked data packet with a system clock of the locating system in accordance with the received clock synchronization symbol. The direction processing system of the locating station includes a phase detector for determining the phase of the received data packet relative to the system clock, and an amplitude detector for determining the amplitude of the received data packet. The position processing system of the locating station includes a signal processing system in communication with the phase detector and the amplitude detector for deriving the transmission angle from the phase and the amplitude.

The configurable directional antenna comprises a monopole array which includes a centre antenna element in communication with the communication interval processing system and the direction processing system, a plurality of second antenna elements disposed about the centre antenna element. Each second antenna element, together with the centre antenna element, comprises an antenna sector, with each antenna sector defining an antenna lobe. A first portion of the second antenna elements is disposed at an inner radius about the centre antenna element, and a second portion of the second antenna elements is disposed at an outer radius about the centre antenna element, such that each antenna sector includes one of the radially inner second antenna elements, one of the radially outer second antenna elements, and a conductor extending between the respective radially inner and outer second antenna elements. The monopole array also includes a switch matrix coupled to each antenna sector for altering the shape and gain of the antenna lobe pattern.

The position processing system of the locating station is in communication with the switch matrix for altering each antenna lobe configuration as necessary to obtain the desired tracking resolution. The signal processing system of the position processing system includes an ambient noise database identifying ambient noise surrounding the monopole array, and a signal processor in communication with the ambient noise database for determining the target position with reference to the ambient noise.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
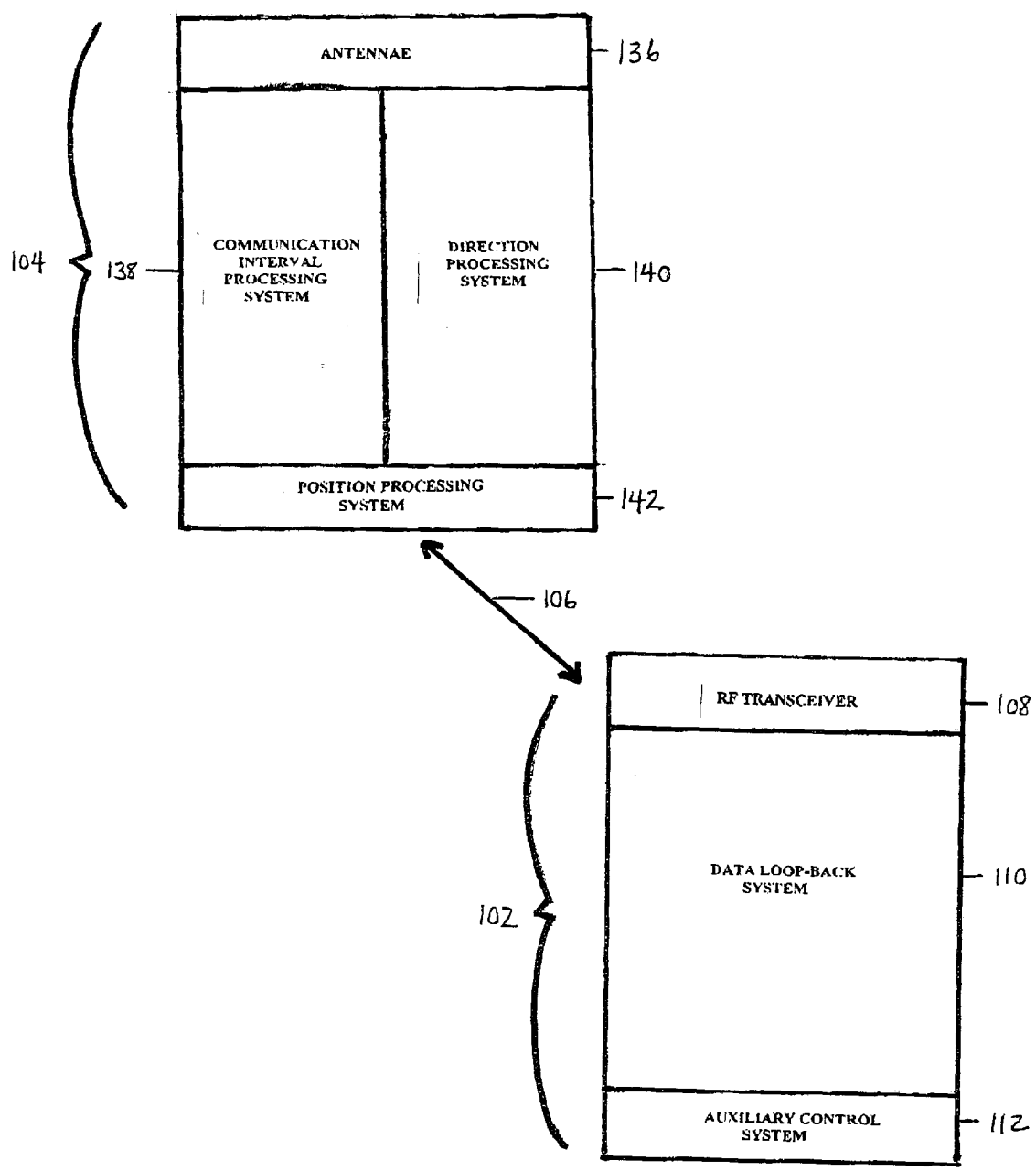
FIG. 1 is a schematic view of the wireless tracking system, according to the present invention, depicting the wireless target, and the configurable monopole array, the communication interval processing system, the direction processing system, and the position processing system of the wireless locating station.

Turning to FIG. 1, a wireless tracking system, denoted generally as 100, is shown comprising a wireless target 102 and a wireless locating station 104 configured for communication over a wireless communication path 106. Although FIG. 1 only shows a single wireless target 102, it should be understood at the outset that the wireless tracking system 100 typically comprises a number of wireless targets, and that a single wireless target 102 is shown in FIG. 1 merely for the purpose of clarity. Typically, the wireless target 102 is concealed in an automobile or secured to an object to allow the wireless locating station to determine its position. However, the wireless target 102 may also be implemented as part of a wrist strap or ankle strap to identify the position of persons or animals fitted with the wireless target 102. Also, preferably the locating station 104 is located on a roof top or a tower so as to provide a clear vantage point for line of sight communication with the wireless target 102, although the locating station 104 may also be implemented as a mobile unit in areas where a clear line of sight is not possible or where a fixed vantage point is not available. To minimize bandwidth requirements, preferably the wireless target 102 is configured for half duplex communication with the locating station 104. However, the wireless target 102 and the locating station 104 may also be configured for full duplex communication if desired.

Figure 2:
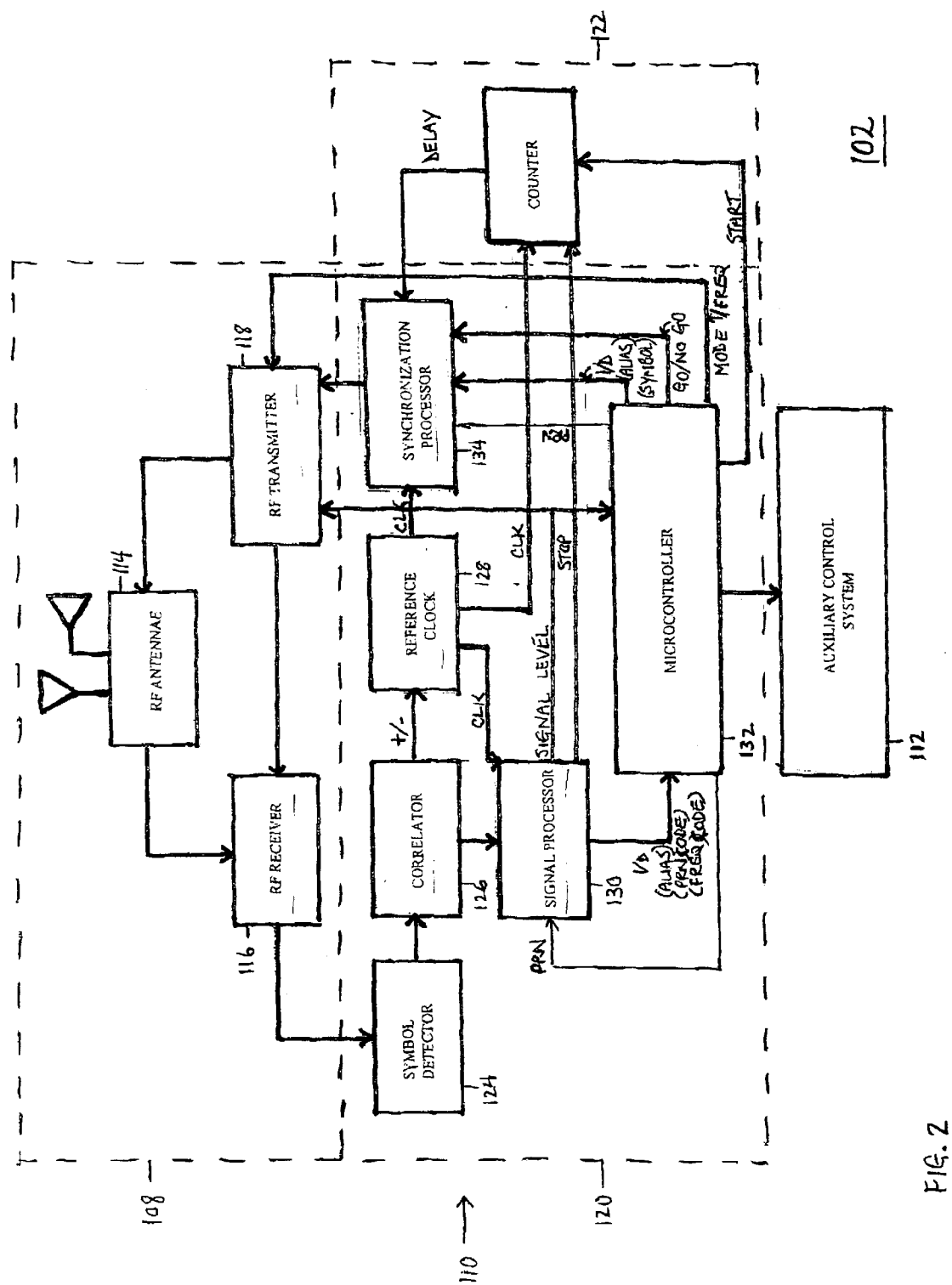
FIG. 2 is a schematic diagram of the wireless target shown in FIG. 1, depicting the data transceiver and the loop-through system.

As shown in FIGS. 1 and 2, the wireless target 102 comprises an RF transceiver 108 for communication with the locating station 104, and a loop-through system 110 in communication with the RF transceiver 108 for transmitting a data packet to the locating station 104 in response to a target identification data key received from the locating station 104. As will be explained below, each wireless target 102 is configured with a target identification code which is uniquely associated with the wireless target 102. Accordingly, preferably the wireless target 102 whose target identification data code matches the transmitted target identification data key communicates with the locating station 104. However, to reduce the possibility of the true location of the wireless target 102 being concealed by thieves obtaining and transmitting to the locating station 104 the target identification data code of the wireless target 102, in one variation each wireless target 102 is configured with a target alias code which the locating station 104 dynamically assigns to the wireless target 102. As will be appreciated, in this variation the wireless target 102 whose target alias code matches the transmitted target identification data key communicates with the locating station 104.

Preferably, the wireless target 102 also includes an auxiliary control system 112 in communication with the loop-through system 110 for activating audible and/or visible alarms when the object bearing the wireless target 102 is moved without authorization. For instance, if the wireless target 102 is installed in an automobile, the auxiliary control system 112 interfaces with the automobile's electrical system for flashing the automobile's lights and horn and for disabling the ignition system of the automobile if the automobile is moved from its pre-alarm position.

The RF transceiver 108 comprises an RF antenna 114 for transmitting and receiving RF signals, an RF receiver 116 coupled to the RF antenna 114 for receiving and demodulating data from the locating station 104, and an RF transmitter 118 coupled to the RF antenna 114 for modulating and transmitting data to the locating station 104. The RF receiver 116 and the RF transmitter 118 may comprise either analog or digital communications devices. Preferably, the wireless target 102 and the locating station 104 communicate with each other over a wide variety of frequencies, using a defined sequence of frequency hops, to reduce the likelihood of jamming and to detect and reduce the impact of multi-path distortions on detection resolution and accuracy. Therefore, preferably the RF receiver 116 and the RF transmitter 118 each include a programmable gain RF pre-amplifier and a fast hopping phase lock loop driven by a frequency control signal from the loop-through system 110 for commanding the receive and transmit frequencies for the RF receiver 116 and the RF transmitter 118. Further, in order to provide the locating station 104 with an indication of the internal propagation delay through the wireless target 102, preferably the RF transmitter 118 includes an output for transmitting an RF signal directly to the RF receiver 116. This aspect of the wireless target 102 will be explained in further detail below.

The loop-through system 110 comprises a data loop-back system 120 in communication with the RF receiver 116 and the RF transmitter 118 for transmitting the data packet to the locating station 104 upon receipt of the target identification data key from the locating station 104. The loop-through system 110 also comprises a propagation delay processing system 122 in communication with the data loop-back system 120 for determining a propagation delay through the target 102.

The data loop-back system 120 comprises a symbol detector 124 coupled to the base-band output of the RF receiver 116, a clock synchronization symbol correlator 126 coupled to the output of the detector 124, a reference clock 128 coupled to a correlator output of the symbol correlator 126, a signal processor 130 coupled to a signal output of the symbol correlator 126, a microcontroller 132 coupled to an output of the signal processor 130, and a synchronization processor 134 coupled to the reference clock 128 and the microcontroller 132. The output of the synchronization processor 134 is coupled to the RF transmitter 118 for transmission to the locating station 104 or for loop-back purposes. Alternately, in one variation (not shown), the orientation of the symbol detector 124 and the symbol correlator 126 are reversed, with the symbol correlator 126 being coupled to the output of the RF receiver 116, and the symbol detector 124 being coupled to the output of the symbol correlator 126 for coherent detection.

The symbol detector 124 is configured to identify and extract clock synchronization symbols from the RF signal transmitted from the locating station 104, and to transmit the extracted clock synchronization symbols to the symbol correlator 126 so as to synchronize the frequency and phase of the reference clock 128 with the frequency and phase of the system clock of the locating station 104. In this manner, the data packet is transmitted to the signal processor 130 in synchronism with the locating station system clock. By synchronizing the reference clock 128 with the system clock of the locating station 104, the sensitivity of the locating station 104 to multi-path distortion is reduced in comparison to the prior art, without the need to fit each wireless target 102 with an expensive high precision crystal oscillator.

Figure 9:
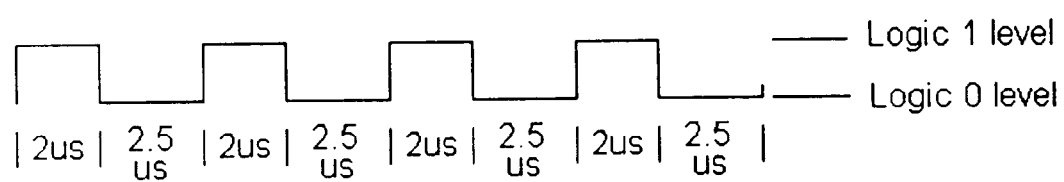
FIG. 9 is a timing diagram depicting an asymmetrical data word clock, referred to by the inventors as a "Genlock Waveform", for synchronizing the local reference clocks of the wireless targets with the system clock of the wireless locating station.

The preferred clock synchronization symbol, referred to by the inventors as a "Genlock Waveform", comprises an 8-bit asymmetrical data word defined as "01010101" (MSB to LSB), with each "1" bit being a full bit in duration and each "0" bit being 1.25 bits in duration. A sample Genlock Waveform (generated from a 16 MHZ system clock) is shown in FIG. 9, with each "1" bit having a duration of 2 µs, and each "0" bit having a duration of 2.5 µs.

Figure 10:
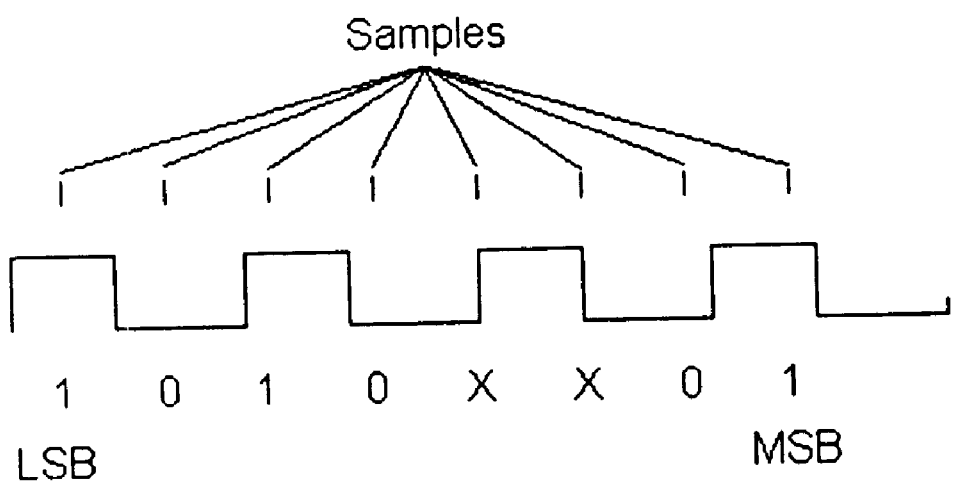
FIG. 10 is a timing diagram depicting a clock synchronization symbol produced from the Genlock Waveform when the local reference clock of a wireless target is synchronized with the system clock.

As shown in FIG. 10, if the reference clock 128 is synchronized with the system clock of the locating station 104, the clock synchronization symbol extracted by the symbol detector 124 will be "10XX0101", with the "X" bits resulting from a sample which falls on a bit transition and, therefore, represents a bit whose value may be ignored.

Figure 11:
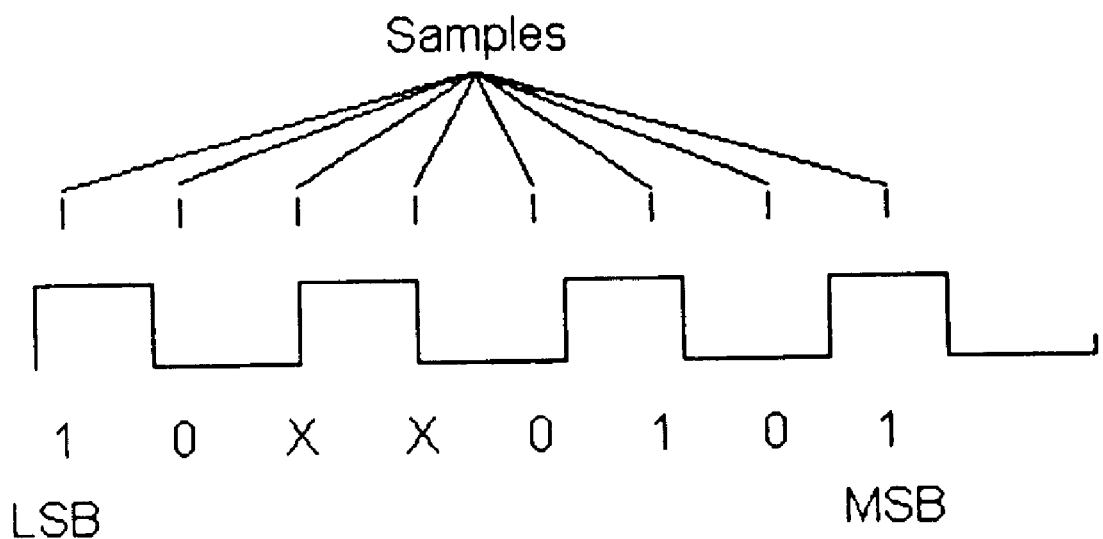
FIG. 11 is a timing diagram depicting a clock synchronization symbol produced from the Genlock Waveform when the local reference clock of a wireless target is advanced relative to the system clock.

On the other hand, as shown in FIG. 11, if the reference clock 128 is ¼ bit early, the clock synchronization symbol extracted by the symbol detector 124 will be "1010XX01":

If the reference clock 128 is more than ¼ bit early, the clock synchronization symbol extracted by the symbol detector 124 will be "10101001".

Figure 12:
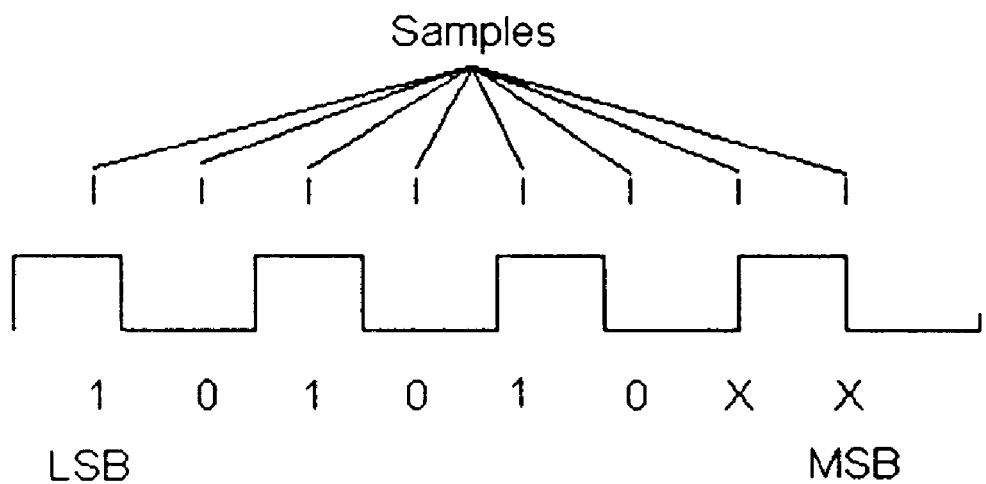
FIG. 12 is a timing diagram depicting a clock synchronization symbol produced from the Genlock Waveform when the local reference clock of a wireless target is retarded relative to the system clock.

Similarly, as shown in FIG. 12, if the reference clock 128 is ¼ bit late, the clock synchronization symbol extracted by symbol detector 124 will be "XX010101."

If the reference clock 128 is more than ¼ bit late, the clock synchronization symbol extracted by the symbol detector 124 will be "01010101". Consequently, if the clock synchronization symbol extracted by the symbol detector 124 is "10101001", the reference clock 128 is more than ¼ bit early, and the symbol correlator 126 will retard the reference clock 128 so as to synchronize the reference clock 128 with the system clock of the locating station 104. On the other hand, if the clock synchronization symbol extracted by the symbol detector 124 is "01010101", the symbol correlator 126 is more than ¼ bit late, and the symbol detector 124 will advance the reference clock 128 so as to synchronize the reference clock 128 with the system clock of the locating station 104. As will be apparent, the phase adjustments alone may be insufficient to synchronize the reference clock 128 with the system clock if the frequency of the reference clock 128 is sufficiently different from that of the system clock. Accordingly, the symbol correlator 126 is configured to adjust the frequency of the reference clock 128 if a phase adjustment alone would not achieve synchronization.

The signal processor 130 is configured to identify and extract the target identification data key from the synchronized base-band signal received from the symbol correlator 126, and to transmit the extracted target identification data key to the microcontroller 132. However, in one variation, the locating station 104 transmits to the wireless target 102 a target alias code in addition to the target identification data key for dynamically assigning the wireless target 102 with a target alias, and the signal processor 130 is configured to identify and extract the target alias code and the target identification data key from the synchronized base-band signal, and to transmit the extracted target alias code and the extracted target identification data key to the microcontroller 132.

The signal processor 130 is also configured to identify and extract a loop-back symbol from the synchronized base-band signal, and to transmit the extracted loop-back symbol to the propagation delay processing system 122. In addition, the signal processor 130 is configured to determine the signal level of the synchronized base-band signal, and to provide the RF transmitter 128 with an analog signal indicative of the signal level of the signal received from the locating station 104. As will be appreciated, the RF transmitter 128 uses the signal level indicator from the signal processor 130 to set the transmit power of the RF transmitter 114 at a level sufficient for reception by the locating station 104.

Preferably, the signal processor 130 is also configured to identify and extract frequency hop codes and pseudo-random noise sequence codes from the synchronized base-band signal received from the symbol correlator 126, and to transmit the extracted frequency hop codes and pseudo-random noise sequence (PRN) codes to the microcontroller 132. As will be explained below, the frequency hop codes are received from the locating station 104, and are used by the microcontroller 132 to specify a desired frequency hop sequence to be used by the RF receiver 116 and the RF transmitter 118. The PRN codes are received from the locating station 104, and are used by the microcontroller 132 to specify a desired pseudo-random noise encoding sequence for direct sequence spread encoding of the data packet by the synchronization processor 134 prior to transmission of the data packet back to the locating station 104. The PRN code is also used by the microcontroller 132 to specify a desired pseudo-random noise decoding sequence for direct sequence spread decoding of the base-band signal received from the symbol correlator 126. As will be explained, direct sequence spread encoding and decoding provides a measure of protection against narrow band jamming, and therefore provides the locating station 104 with more accurate amplitude information for the determination of the position of the wireless target 102.

If the wireless target 102 is fitted into an automobile, preferably the automobile owner is provided with a portable wireless identification transmitter (not shown), suitable for attachment to a key chain. In this variation, the wireless identification transmitter is configured to periodically transmit a user identification key to the wireless target 120, and the signal processor 130 is configured to identify and extract the user identification key from the RF signal received from the wireless identification transmitter, and to transmit the extracted user identification key to the microcontroller 132. The signal processor 130 is also configured to provide the microcontroller 132 with a signal indicative of the signal level of the signal received from the wireless identification transmitter in order to allow the microcontroller 132 to determine the approximate range of the bearer of the wireless identification transmitter relative to the wireless target 102.

Alternately, in another variation, the automobile owner is provided with a portable wireless identification transceiver. The wireless target 102 is configured to periodically transmit a user identification key to the wireless identification transceiver, and the wireless identification transceiver configured with the user identification code corresponding to the transmitted user identification key transmits the user identification key back to the wireless target 102. As above, the signal processor 130 is configured to identify and extract the user identification key from the RF signal received from the wireless identification transmitter, and to transmit the extracted user identification key to the microcontroller 132. The signal processor 130 is also configured to provide the microcontroller 132 with a signal indicative of the signal level of the signal received from the wireless identification transceiver in order to allow the microcontroller 132 to determine the approximate range of the bearer of the wireless identification transmitter relative to the wireless target 102.

The microcontroller 132 includes a built-in memory which stores a sequence of program instructions for proper operation of the microcontroller 132, a built-in memory which permanently stores the target identification code uniquely associated with the wireless target 102, a built-in memory which includes transmit and receive frequencies for a plurality of frequency hop codes, and a built-in memory which includes pseudo-random noise (PRN) sequences for a plurality of PRN codes. Preferably, the microcontroller 132 also includes a built-in memory which stores a target alias code assigned by the locating station 104, and a built-in memory which stores a user identification code. The sequence of program steps defined by the program instructions are discussed below.

The synchronization processor 134 includes a clock input coupled to the reference clock 128 for synchronizing data transmission between the wireless target 102 and the locating station 104. The synchronization processor 134 is configured to receive from the microcontroller 132 the target identification code assigned to the wireless target 102, and to receive from the propagation delay processing system 122 an indication of the propagation delay through the wireless target 102, and to assemble the received target identification code and the received propagation delay indication into the data packet for transmission to the locating station 104 via the RF transmitter 118 and the RF antenna 114. In the variation where the wireless target 102 is programmed with a target alias code, the synchronization processor 134 is configured to receive from the microcontroller 132 the target alias code currently assigned to the wireless target 102, and to receive from the propagation delay processing system 122 the propagation delay indication, and to assemble the received target alias code and the received propagation delay indication into the data packet for transmission to the locating station 104 via the RF transmitter 118 and the RF antenna 114.

The propagation delay processing system 122 is configured for determining the propagation delay through the wireless target 102 in accordance with receipt instances of the loop-back symbols, as extracted from the synchronized base-band signal by the signal processor 130. Preferably, the propagation delay processing system 122 comprises a loop-back counter which includes a start control input coupled to a control output of the microcontroller 132, a stop control input coupled to a symbol output of the signal processor 130, and a clock input coupled to the reference clock 128 for counting the time between receipt instances of the loop-back symbols (as defined by the elapsed time between activation of the start control input and the stop control input). The loop-back counter also includes a data output coupled to the synchronization processor 134 for providing the synchronization processor 134 with a data field identifying the propagation delay count.

As will be discussed below, the microcontroller 132 commands the loop through system 110 to determine the propagation delay of the wireless target 102 by issuing a start count command to the loop-back counter and simultaneously transmitting a loop-back symbol to the synchronization processor 134. The microcontroller 132 also issues a mode command which instructs the RF transmitter 118 to transmit the loop-back symbol received from the synchronization processor 134 directly to the RF receiver 116. Upon receipt of the loop-back symbol, the signal processor 130 issues a stop count command to the loop-back counter. The propagation delay as counted by the loop-back counter is then transmitted to the synchronization processor 134 as a data field to be incorporated into the data packet transmitted to the locating station 104. Preferably, the propagation delay processing system 122 also includes a temperature, humidity and/or voltage sensor coupled to the microcontroller 132 which initiates propagation delay self-determination when the environmental conditions to which the wireless target 102 is exposed deviate by a predetermined amount.

In one variation (not shown), the propagation delay processing system 122 comprises a temperature, humidity and/or voltage sensor, and a one-shot counter which includes a start control input coupled to the sensor, a stop control input coupled to a symbol output of the signal processor 130, and a pulse data output coupled to the RF transmitter 118 for providing the RF transmitter 118 with a pulse whose width corresponds to the propagation delay through the wireless target 102. In this variation, when the power supply voltage of the wireless target 102 or the environmental conditions to which the wireless target 102 is exposed deviate by a predetermined amount, the sensor commands the loop through system 110 to determine the propagation delay of the wireless target 102 by issuing a start command to the one-shot counter. Upon receipt of the start command, the one-shot counter transmits a loop-back symbol to the RF transmitter 118. The temperature and/or humidity sensor also issues a mode command which instructs the RF transmitter 118 to transmit the loop-back symbol received from the one-shot counter to the transmitting unit of the RF antenna 114. Upon receipt of the loop-back symbol by the receiving unit of the RF antenna 114 and the RF receiver 116, the signal processor 130 issues a stop command to the one-shot counter. The one-shot counter then removes the loop-back symbol from the RF transmitter 118, and causes the sensor to remove its mode command from the RF transmitter 118. The locating station 104 measures the pulse width of the loop-back symbol, and determines the propagation delay through the wireless target 102 from the measured pulse width.

In another variation (not shown), the propagation delay processing system 122 comprises a temperature, humidity and/or voltage sensor, and the microcontroller 132 is configured for providing the RF transmitter 118 with a periodic signal whose period identifies the propagation delay through the wireless target 102. In this variation, when the power supply voltage of the wireless target 102 or the environmental conditions to which the wireless target 102 is exposed deviate by a predetermined amount, the sensor commands the microcontroller 132 to transmit a first loop-back symbol to the synchronization processor 134. The microcontroller 132 also issues. a mode command which instructs the RF transmitter 118 to transmit the first loop-back symbol received from the synchronization processor 134 to the transmitting unit of the RF antenna 114. Upon receipt of the first loop-back symbol by the receiving unit of the RF antenna 114, the signal processor 130 transmits the received first loop-back symbol to the microcontroller 132. The microcontroller 132 then transmits a second loop-back symbol to the synchronization processor 134 and instructs the RF transmitter 118 to transmit the second loop-back symbol received from the synchronization processor 134 to the transmitting unit of the RF antenna 114. Upon receipt of the second loop-back symbol by the receiving unit of the RF antenna 114, the signal processor 130 transmits the received second loop-back symbol to the microcontroller 132 to repeat the cycle. The locating station 104 measures the period of the cycle, and determines the propagation delay through the wireless target 102 from the measured period.

Other means of initiating propagation delay self-determination are envisaged, and include configuring the signal processor 130 or the microcontroller 132 to initiate loop-back symbol transmission upon receipt of a loop-back symbol command received from the locating station 104. Other implementations for providing the locating station 104 with an indication of the propagation delay through the wireless target 102 will be apparent to those of ordinary skill.

As discussed above, the microcontroller 132 includes a built-in memory which stores a sequence of program instructions for proper operation of the microcontroller 132. The sequence of program steps defined by the program instructions configure the microcontroller 132 to query the built-in memory to determine whether the target identification data key received from the locating station 104 matches the target identification code assigned to the wireless target 102. If the target identification data key matches the assigned target identification code, the microcontroller 134 provides the synchronization processor 134 with a GO signal which commands the synchronization processor 134 to provide the RF transmitter 118 with a data packet for transmission to the locating station 104. Preferably, the data packet includes the target identification code, and a data field specifying the propagation delay through the wireless target 102. On the other hand, if the target identification data key does not match the assigned target identification code, the microcontroller 134 provides the synchronization processor 134 with a NOGO signal which prevents the synchronization processor 134 from providing the RF transmitter 118 with the data packet.

In the variation, discussed above, where the microcontroller 132 includes a built-in memory which stores a target alias code, the locating station 104 assigns the wireless target 102 with a target alias code by transmitting to the wireless target 102 a target identification data key matching the target identification code assigned to the wireless target 102, and a data element identifying the target alias code. After the target alias code is assigned to the wireless target 102, the locating station 104 communicates with the wireless target 102 by transmitting the target alias code to the wireless target 102. Accordingly, in this variation, the sequence of program steps defined by the program instructions configure the microcontroller 132 to store the target alias code in the built-in memory if the accompanying target identification data key matches the target identification code assigned to the wireless target 102. If the locating station 104 transmits a target alias code without the accompanying a target identification data key matching the target identification code assigned to the wireless target 102, the target alias code acts as the target identification data key, and the sequence of program steps defined by the program instructions configure the microcontroller 132 to query the built-in memory to determine whether the target identification data key received from the locating station 104 matches the target alias code assigned to the wireless target 102. If the target identification data key matches the assigned target alias code, the microcontroller 134 provides the synchronization processor 134 with a GO signal which commands the synchronization processor 134 to provide the RF transmitter 118 with a data packet for transmission to the locating station 104. Preferably, the data packet includes the target alias code, and a data field specifying the propagation delay through the wireless target 102. On the other hand, if the target identification data key does not match the assigned target alias code, the microcontroller 134 provides the synchronization processor 134 with a NOGO signal which prevents the synchronization processor 134 from providing the RF transmitter 118 with the data packet.

In the variation, discussed above, where the microcontroller 132 includes a built-in memory which stores frequency hop sequences, and pseudo-random noise sequences, the locating station 104 assigns the wireless target 102 to use a particular frequency hop sequence and/or a particular PRN sequence by transmitting to the wireless target 102 a target identification data key matching the target identification code assigned to the wireless target 102, and a data element identifying the frequency hop code and/or the PRN code. After the frequency hop code and/or direct sequence code is assigned to the wireless target 102, microcontroller 132 facilitates communication between the wireless target 102 and the locating station 104 by transmitting the appropriate frequency commands to the RF receiver 116 and the RF transmitter 118, and by transmitting the appropriate PRN data to the signal processor 130 and the synchronization processor 134. Accordingly, in this variation, the sequence of program steps defined by the program instructions configure the microcontroller 132 to store the received frequency hop code and the received PRN code in the built-in memory if the accompanying target identification data key matches the target identification code assigned to the wireless target 102.

In the variation, discussed above, where the microcontroller 132 includes a built-in memory which stores a user identification code, the microcontroller 132 is configured to query the built-in memory to determine whether the user identification key received from the portable wireless identification transmitter matches the user identification code assigned to the wireless target 102. If the user identification key matches the assigned user identification code, the microcontroller 134 uses the RF signal power output signal from the signal processor 130 to determine whether the bearer of the portable wireless identification transmitter is within a predetermined maximum range of the wireless target 102. If the microcontroller 134 determines that the bearer of the portable wireless identification transmitter is not within a predetermined maximum range of the wireless target 102, the microcontroller 134 is configured to provide the synchronization processor 134 with an alarm symbol for transmission to the locating station 104. Preferably, the synchronization processor 134 includes the alarm symbol and the target identification code (or the target alias code if assigned) as part of the data packet transmitted to the locating station 104. The locating station 104 is configured to begin communication with the wireless target 102 upon receipt of the alarm code so as to periodically determine the position of the wireless target 102. In this manner, the locating station 104 is able to notify the user or enforcement authorities if the vehicle moves from its pre-alarm position without the user having to notify the locating station 104 that the vehicle is missing.

As shown in FIG. 1, the wireless locating station 104 includes a directional antenna 136 for communicating with the wireless target 102, a communication interval processing system 138 in communication with the directional antenna 136, a direction processing system 140 in communication with the directional antenna 136, and a position processing system 142 in communication with the interval processing system 138 and the direction processing system 140. As will be explained below, the communication interval processing system 138 determines the time required for the data packet transmitted from the wireless target 102 to reach the directional antenna 136 (referred to herein as the "transmission interval"), and the direction processing system 140 determines the transmission angle of the data packet. The position processing system 142 determines the position of the wireless target 102 from the identification code transmitted with the data packet, the transmission interval and the transmission angle.

Figure 3:
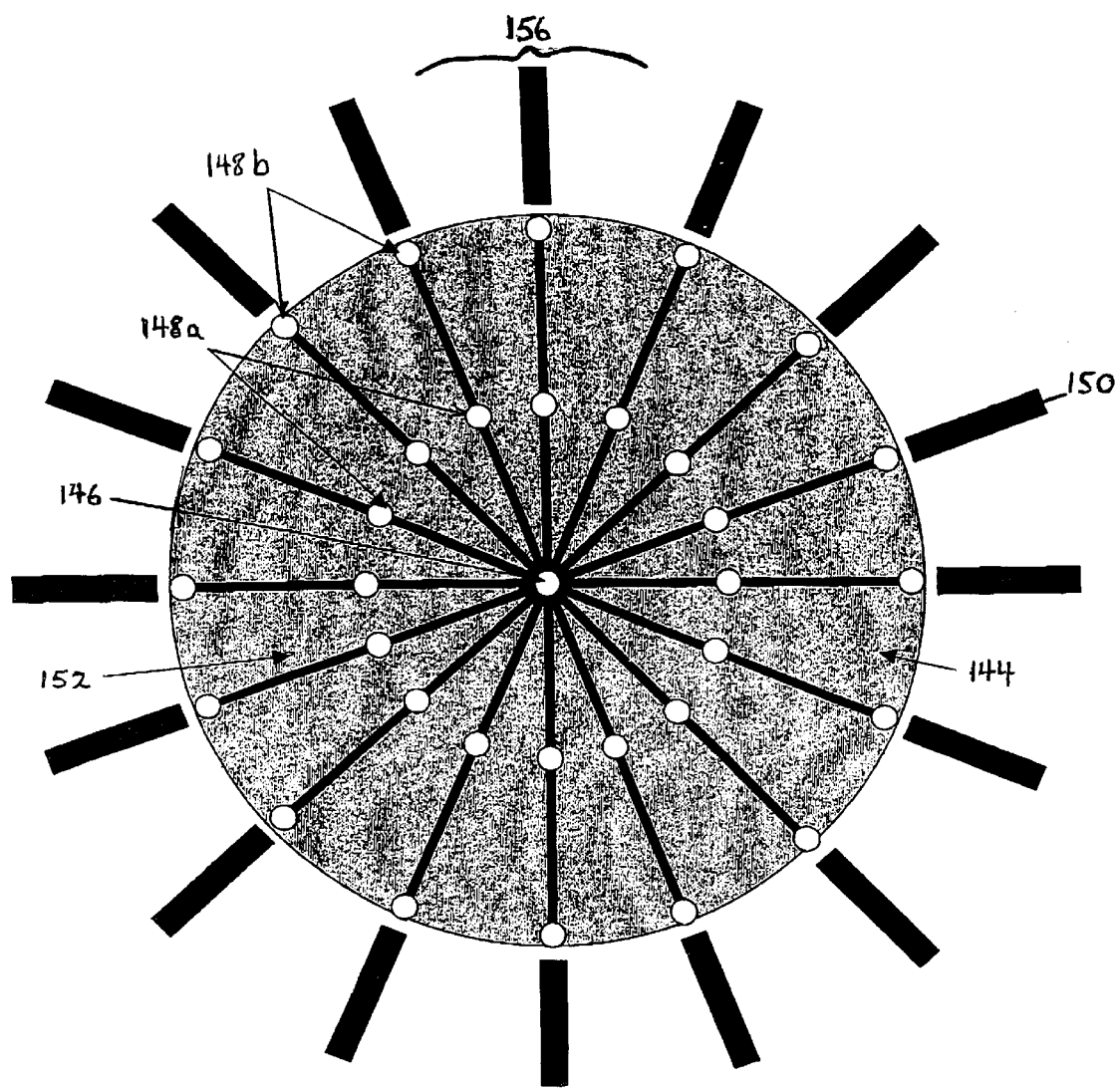
FIG. 3 is a schematic view of the configurable monopole array of the wireless locating station shown in FIG. 1, depicting in top view the ground radials, and the centre antenna element, the second antenna elements and the stripline conductors of the antenna sectors.

The directional antenna 136 may comprise any suitable directional antenna, such as a Yagi antenna or an array of antenna. However, preferably the directional antenna 136 is programmable and comprises the configurable monopole array shown in FIG. 3. The monopole array 136 comprises a substantially circular ground plane 144, a vertically-oriented centre antenna element 146 disposed at the geometric centre of the ground plane 144, an even number of second vertically-oriented antenna elements 148 disposed around the centre antenna element 146, an even number of ground radials 150 disposed radially outwards from the second antenna elements 148, and a plurality of stripline conductors 152 and extending between the centre antenna element 146 and the second antenna elements 148. The monopole array 136 also includes a switch matrix 154 (see FIG. 4) coupled to the second antenna elements 148 and the ground radials 150 for varying the configuration of the monopole array 136.

The centre antenna element 146 is coupled to the communication interval processing system 138 and the direction processing system 140 so as to be able to transmit and receive RF energy between the wireless target 102 and the communication interval processing system 138 and the direction processing system 140. Preferably, each antenna element 146, 148 is fabricated as a monopole antenna element. However, other antenna shapes may be used, including straight radiators, log periodical radiators, helical radiators, stripline radiators, quad radiators, patch radiators, and fractal radiators.

As will be apparent, a first portion 148a of the second antenna elements is disposed at an inner radius about the centre antenna element 146, and a second portion 148b of the second antenna elements is disposed at an outer radius about the centre antenna element 146. Similarly, a first portion 152a of the stripline conductors extend between the centre antenna element 146 and the radially inner antenna elements 148a, and a second portion 152b of the stripline conductors extend between the radially inner antenna elements 148a and the radially outer antenna elements 148b. Further, preferably the second antenna elements 148 are equally angularly spaced about the centre antenna element 146, and the stripline conductors 152 extend radially outwards from the centre antenna element 146 at equal angular intervals, such that the second antenna elements 148 and the stripline conductors 152 define together an even number of antenna sectors 156 equally spaced around the centre of the monopole array 136.

Preferably, each antenna sector 156 comprises the centre antenna element 146, and a respective one of the radially inner antenna elements 148a, the radially outer antenna elements 148b, the radially inner stripline conductors 152a, the radially outer stripline conductors 152b, and the ground radiators 150. However, as the gain of each antenna sector 156 can be increased and the minimum beam width of each antenna sector 156 can be improved (reduced) by increasing the number of radially adjacent second antenna elements 148, the monopole array 136 may be configured with a different number of radially adjacent second antenna elements 148 as the application demands. However, the addition of second antenna elements 148 radially outside the inner antenna elements 148a increases mutual coupling between the centre antenna element 146 and the inner antenna elements 148a, thereby increasing the terminating impedance at the centre antenna element 146. Therefore, preferably the outer antenna elements 148b are shorter in length than the inner antenna elements 148a, with the ratio of the lengths of the outer antenna elements 148b to the inner antenna elements 148a being balanced so as to obtain sufficient gain without significantly increasing terminating impedance.

Further, preferably the monopole array 136 includes sixteen antenna sectors 156, thereby providing the monopole array 136 with a pointing resolution of 22.5° for a given lobe pattern. However, it will be appreciated that the angular resolution of the monopole array 136 can be varied to satisfy the demands of the application by increasing or decreasing the number of the antenna sectors 156.

Figure 4:
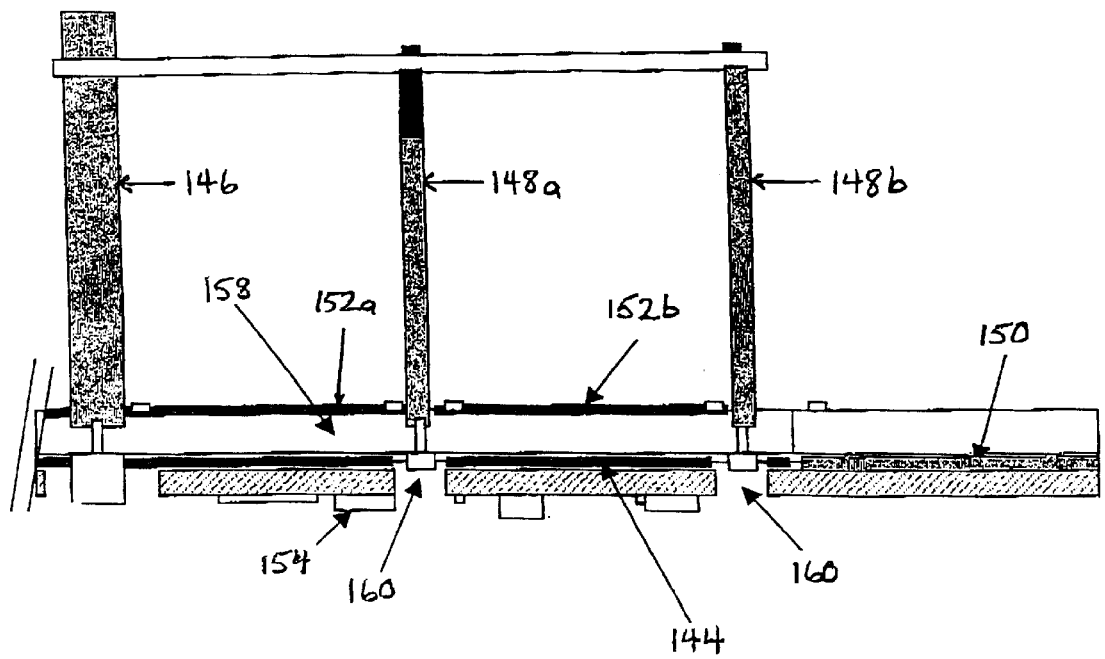
FIG. 4 is a schematic diagram of the configurable monopole array shown in FIG. 3, depicting in edge view the antenna elements, the ground plane, the stripline conductors, the ground radials, and the switch matrix.

As shown in edge view in FIG. 4, the ground plane 144, the stripline conductors 152 and the switch matrix 154 are fabricated together as a three layer printed circuit board 158, with the stripline conductors 152 being disposed above and electrically isolated from the ground plane 144. The printed circuit board 158 includes a number of studs 160, each of which is used to fixedly retain one end of a respective one of the antenna elements 146, 148. The conductive material immediately surrounding each stud 160 is removed from the ground plane 144 and the stripline conductors 152 so as to electrically isolate the ground plane 144 and the stripline conductors 152 from the antenna elements 146, 148.

Figure 5:
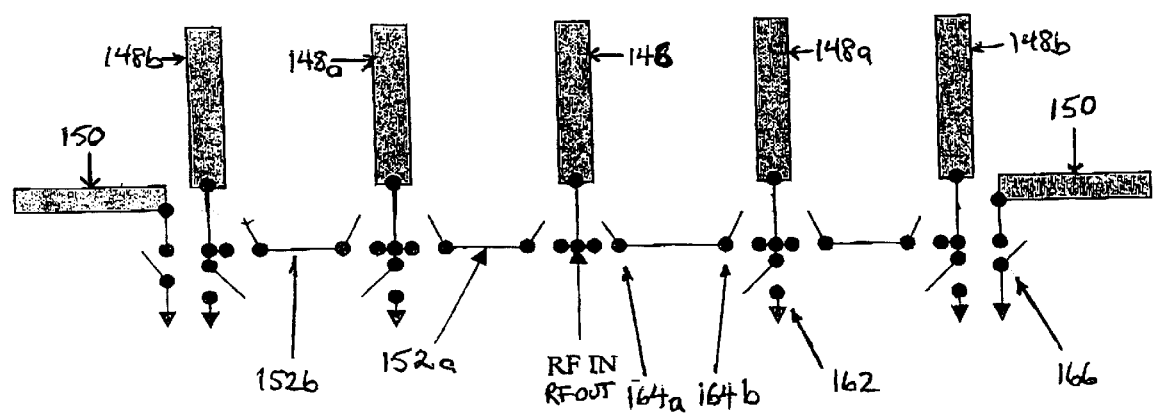
FIG. 5 is a schematic diagram of the switch matrix shown in FIG. 4.

Preferably, the switch matrix 154 is fabricated as an active switch matrix and, as shown in FIG. 5, comprises a plurality of first electronic switches 162, a plurality of second electronic switches 164, and a plurality of third electronic switches 166. All of the electronic switches 162, 164, 166 of the switch matrix 154 are controllable by the position processing system 142 so as to configure the monopole array 136 to obtain the desired tracking resolution.

Each first electronic switch 162 is connected to a respective one of the second antenna elements 148 for selectively shorting one end of the second antenna element 148 to the ground plane 144. When the first electronic switch 162 shorts the associated second antenna element 148 ground, the shorted second antenna element 148 is inductively coupled to the ground plane 144 and acts as reflector. When the first electronic switch 162 is open, the associated second antenna element 148 is left floating, and becomes parasitically coupled to the adjacent second antenna elements 148. Further, in this switch position, the second antenna element 148 can act as a director if unterminated or as a radiating element if connected to a source.

Figure 6:
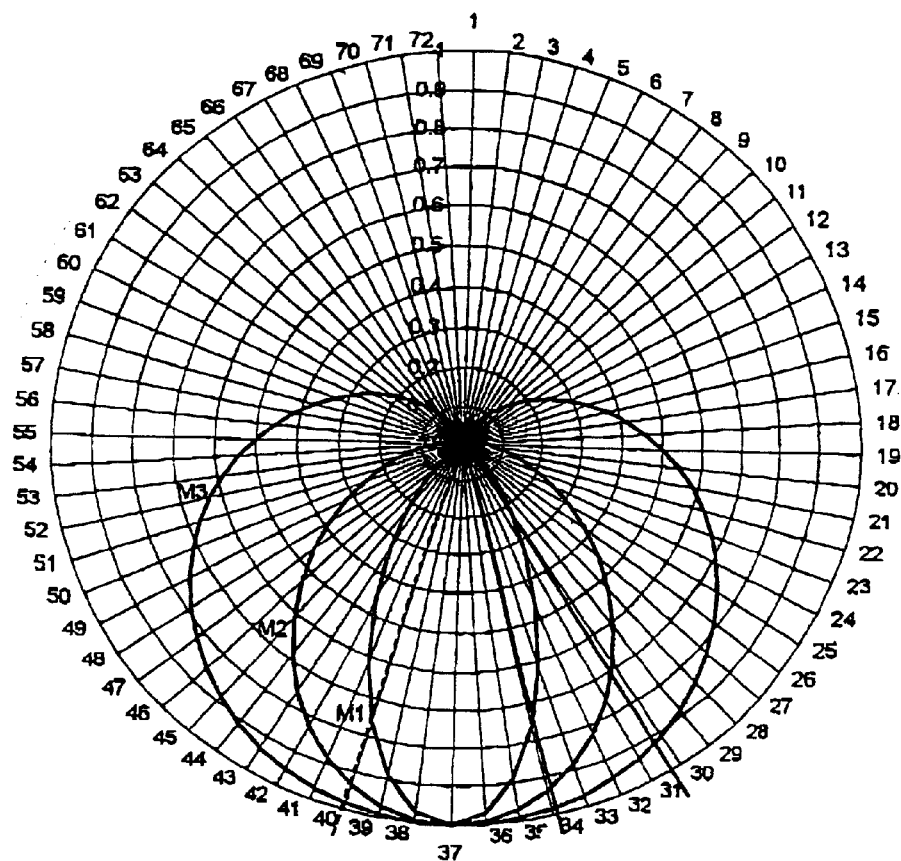
FIG. 6 is a schematic view of sample antenna lobe patterns attainable with the configurable monopole array.

Each second electronic switch 164 comprises an electronic switch pair 164a, 164b. One electronic switch of each second electronic switch pair 164 is connected to a respective one of the second antenna elements 148 and to one end of one of the associated stripline conductors 152, while the other electronic switch of each second electronic switch pair 164 is connected to a radially adjacent one of the second antenna elements 148 and to the opposite end of the stripline conductor 152 for selectively shorting together radially adjacent second antenna elements 148 together. Consequently, by programming the conductive state of each electronic switch 162, 164, the lobe pattern size and shape of each antenna sector 156 can by dynamically varied. FIG. 6 depicts sample antenna lobe patterns which may be obtained with the monopole array 136.

Preferably, each ground radiator 150 comprises a number of ground radials, each having a respective incline angle relative to the ground plane 144. Each third electronic switch 166 is connected to the radial innermost end of a respective one of the inclined ground radials for selectively shorting the radially inner end of the ground radial to the ground plane 144. In this manner, the radiation angle of each antenna sector 156 can be dynamically varied.

In one variation (not shown), the monopole array 136 is provided with a plurality of stripline conductors 152 between each pair of radially adjacent second antenna elements 148, and each second electronic switch comprises a multi-pole electronic switch connected to the stripline conductors 152 for varying the phasing between the radially adjacent second antenna elements 148.

In a preferred implementation of the monopole array 136, the centre antenna element 146 is $9/32$ of a wavelength in length and is designed to be resonant at a the operating frequency. The radially inner antenna elements 148a are $7/32$ of a wavelength in length, and the radially outer antenna elements 148b are $1/4$ of a wavelength in length, with the diameter of the centre antenna element 146 being 2.5 times the diameter of the second antenna elements 148 so as to maintain an impedance of 50 ohms at the centre antenna element 146. The ground radiators 150 are least a $1/4$ wavelength in length. Also, a favourable size to performance ratio has been achieved using sixteen radially inner antenna elements 148a and sixteen radially outer antenna elements 148b, with the spacing between the radially inner stripline conductors 152a and the radially outer stripline conductors 152b being a $1/4$ wavelength in length.

Figure 7:
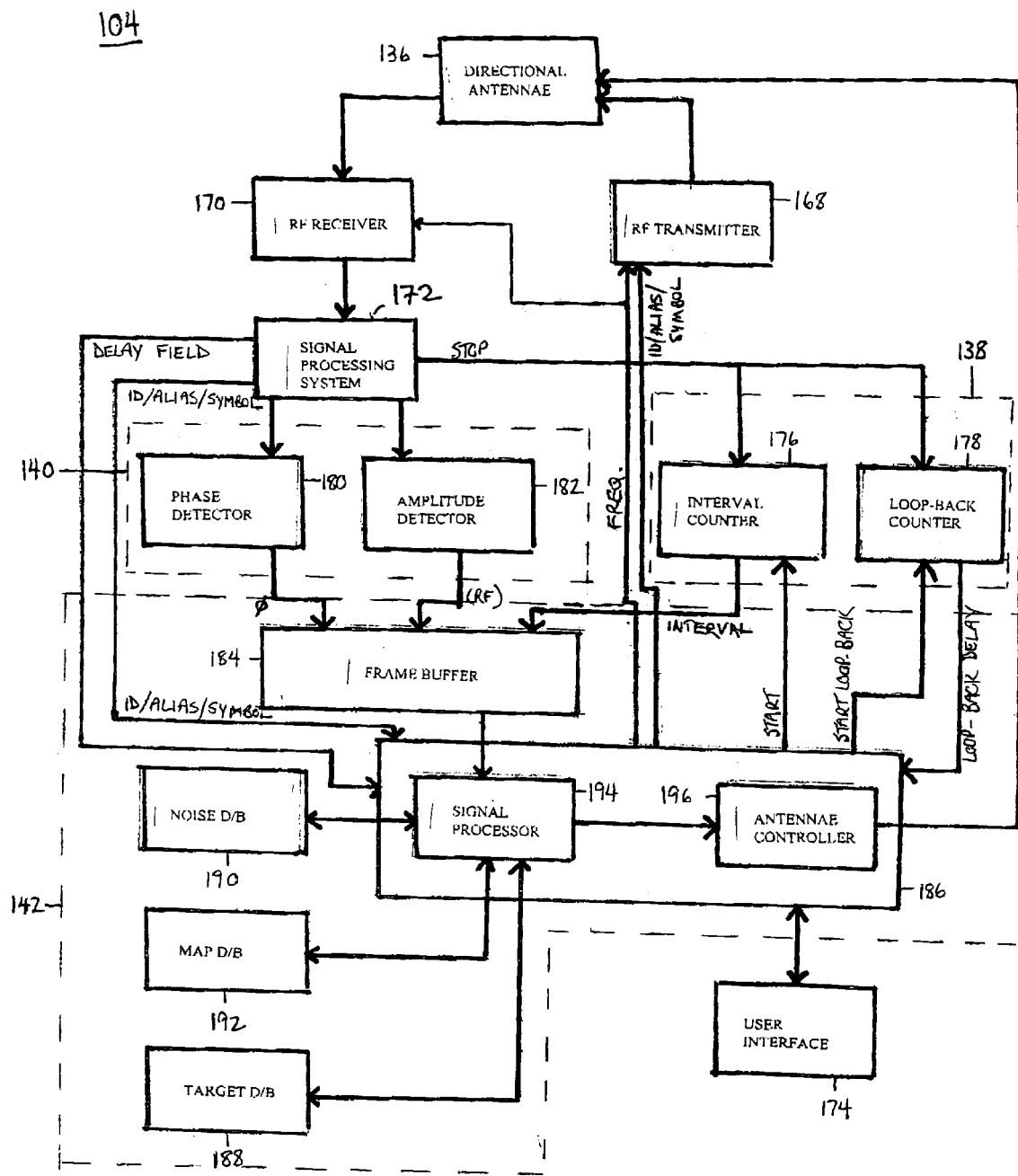
FIG. 7 is a schematic diagram of the wireless locating station shown in FIG. 1, depicting the communication interval processing system, the direction processing system and the position processing system.

Turning now to FIG. 7, the wireless locating station 104 is shown including the directional antenna 136, the communication interval processing system 138, the direction processing system 140, and the position processing system 142, an RF data transmitter 168 in communication with the directional antenna 136 for transmitting a target identification data key to the wireless target 102, and an RF data receiver 170 in communication with the directional antenna 136 for receiving a data packet from the wireless target 102 in response to the transmitted data key. The RF transmitter 168 and the RF receiver 170 may comprise either analog or digital communications devices. The locating station 104 also includes a signal processing system 172 in communication with the RF receiver 170, a user interface 174 in communication with the position processing system 142, and a system clock (not shown) which synchronizes all the system components of the locating station 104.

Preferably, the wireless target 102 and the locating station 104 communicate with each other over a wide variety of frequencies to reduce the likelihood of jamming and to detect and reduce the impact of multi-path distortions on detection resolution. Therefore, preferably the RF data transmitter 168 and the RF data receiver 170 each include a programmable gain RF pre-amplifier and a fast hopping phase lock loop driven by a frequency control signal from the direction processing system 140 for commanding the transmit and receive frequencies for the RF transmitter 168 and the RF receiver 170.

The communication interval processing system 138 comprises an interval counter 176 for determining the transmission interval between the transmission instant of the target identification data key and the receipt instant of the data packet, and a loop-back counter 178 for determining a propagation delay through the locating station 104. The calculated propagation delay is used by the position processing system 142, conjunction with the transmission interval calculated by the interval counter 176 to determine the actual transmission interval between the instant of transmission of the target identification data key to the wireless target 102 and instant of receipt of the data packet from the wireless target 102. As will be appreciated, the data packet is received from the wireless target 102 whose target identification code (or target alias code if assigned) matches the transmitted target identification data key.

The interval counter 176 is also in communication with the directional antenna 136 (via the signal processing system 172) and is configured to determine the transmission interval of the wireless transmission as received by each antenna sector 156. The interval counter 176 includes a start input coupled to the position processing system 142 for receiving a start count command to initiate timing of the transmission interval, and a stop input coupled to the signal processing system 172 for receiving a stop count command to terminate timing of the transmission interval. The interval counter 176 also includes an output coupled to the position processing system 142 for providing the position processing system 142 with the calculated transmission interval for each antenna sector 156. Similarly, the loop-back counter 178 is coupled to the position processing system 142 for receiving a start count command to initiate timing of the propagation delay through the locating station 104, and is also coupled to the signal processing 172 for receiving a stop count command to terminate timing of the propagation delay. The loop-back counter 178 also includes an output coupled to the position processing system 142 for providing the position processing system 142 with the calculated propagation delay.

The direction processing system 140 comprises a phase detector 180 for determining the phase of the received data packet relative to the system clock, and an amplitude detector 182 for determining the amplitude of the transmission from the wireless target 102. Preferably, the phase detector 180 is in communication with the monopole array 136 (via the RF receiver 170) and is configured to determine the phase delay of the wireless transmission as received by each antenna sector 156. Since the wireless target 102 is configured for synchronized communication with the locating station 104, the phase delay at each antenna sector 156 can be readily determined. Preferably, the amplitude detector 182 is in communication with the monopole array 136 (via the RF receiver 170) and is configured to determine the amplitude of the wireless transmission as received by each antenna sector 156. The phase information from the phase detector 180 and the amplitude information from the amplitude detector 182 are transmitted to the position processing system 142 for determination of the angular direction from which the transmission of the wireless target 102 originated. The methods by which the position processing system 142 employs the phase and amplitude information for the determination of the transmission angle will be discussed below.

The signal processing system 172 is in communication with the RF receiver 170, and is configured to identify and extract the target identification data code (or the target alias code if assigned) and the propagation delay field from the data packet received from the wireless target 102, and to transmit the extracted target identification data code (or alias code) and the extracted propagation delay field to the position processing system 142. The signal processor 172 is also configured to identify and extract a loop-back symbol from the base-band signal received from the RF receiver 172, and to transmit the extracted loop-back symbol as a stop command to the communication interval processing system 138. Further, in the variation where the wireless target 102 is configured to transmit an alarm code to the locating station 104 to initiate communication with the locating station 104, preferably the signal processing system 172 is also configured to identify and extract the alarm code from the base-band signal received from the RF receiver 172, and to transmit the extracted alarm code to the position processing system 142.

The user interface 174 includes a data display device (not shown) and a data input device (not shown) to allow a system user to control and monitor the operation of the locating station 104. Preferably, the user interface 174 also includes a communication link with enforcement authorities to notify enforcement authorities of the location of the object bearing the wireless target 102.

The position processing system 142 comprises a frame buffer 184, a system controller 186 in communication with the frame buffer 184 and the RF transmitter 168 for determining the location of the wireless target 102, and a target database 188 which includes records, each identifying the target identification code, target alias code, target propagation delay, and last calculated position for each target. Preferably, the position processing system 142 also comprises an ambient noise database 190 for providing the system controller 186 with noise data identifying ambient noise surrounding the directional antenna 136, and a map database 192 for providing the system controller 186 with street co-ordinates. As will be appreciated, since an automobile fitted with the wireless target 102 generally can only have co-ordinates corresponding to actual street co-ordinates (unless the automobile is located within a dwelling which does not suppress RF communications), the map database 192 enhances the accuracy of the position information as determined by the system controller 186.

The frame buffer 184 is in communication with the interval counter 176, the phase detector 180, and the amplitude detector 182 for receiving and storing the transmission interval, phase, and amplitude information for each antenna sector 156. Further, as discussed above, the wireless target 102 and the locating station 104 communicate with each other over a number of different frequencies to prevent jamming and to enhance co-ordinate resolution. Therefore, preferably the frame buffer 184 stores the transmission interval, phase, and amplitude information at each transmission frequency for each antenna sector 156.

The system controller 186 comprises a microcontroller including a built-in memory which stores a sequence of program instructions for proper operation of the microcontroller. The program instructions configure the system controller 186 to transmit frequency hop codes to the wireless target 102, and to transmit to the RF transmitter 168 and the RF receiver 170 the frequency hop commands corresponding to the selected frequency hop code so as to command the wireless target 102 to communicate with the locating station 104 using the specified frequency hop sequences. The program instructions also configure the system controller 186 to transmit PRN codes to the wireless target 102, and to transmit to the signal processing system 172 the PRN sequence corresponding to the selected PRN code as to facilitate communication between the wireless target 102 and the locating station 104 using direct sequence spread encoding. Also, the program instructions configure the system controller 186 to direct sequence spread encode target identification data keys, target alias keys, and synchronization symbols prior to transmission to the RF transmitter 168.

In addition to the foregoing program instructions, the system controller 186 includes program instructions which comprise a memory object defining a signal processor 194 for determining the target position from the frames of transmission interval, phase and amplitude data, and a memory object defining a directional antenna controller 196 for controlling the configuration of the directional antenna 136. The signal processor 194 and the directional antenna controller 196 are configured to determine the position of the wireless target 102 according to at least one of a number of different methods. With each method, preferably the signal processor 194 is configured with a noise filtering scheme, such as a Fourier transform, or convolution filter to enhance tracking resolution. Further, prior to execution of any of the following methods, preferably the system controller 186 commands the monopole array 136 to operate in omnidirectional mode by performing a 360° scan to provide the noise database 180 with noise information surrounding the monopole array 146, and measures the magnitude and phase at each antenna sector 156 over a number of different frequencies to obtain a preliminary coarse indication of the transmission angle.

In accordance with a first transmission interval determining method, the system controller 186 provides the RF transmitter 168 with a target identification data key for transmission to a wireless target 102, and issues a start count command to the interval counter 176. The wireless target 102 having a target identification code (or target alias code if assigned) corresponding to the target identification key transmits a data packet to the locating station 104. Preferably, the data packet includes the target identification code (or the target alias code if assigned), and a data field identifying the propagation delay through the wireless target 102. Upon receipt of the data packet, the signal processing system 172 transmits the propagation delay data field to the signal processor 194 and issues a stop count command to the interval counter 176. The interval counter 176 then transmits the transmission interval data to the frame buffer 184. The signal processor 194 calculates an estimate of the actual transmission interval by first multiplying the transmission interval data by the system clock frequency to obtain a transmission interval period, and multiplying the loop-back counter data by the system clock frequency to obtain a locating station loop-back period. The signal processor 194 then subtracts, from the transmission interval period, the propagation delay and the loop-back counter period, and then dividing the difference by two. Preferably, the system controller 186 commands the RF transmitter 168 to initiate communication with the wireless target 102 over a number of different frequencies, and the signal processor 194 determines the actual transmission interval from a statistical analysis of the calculated transmission intervals.

In accordance with a second transmission interval determining method, the system controller 186 provides the RF transmitter 168 with a target identification data key for transmission to a wireless target 102. The interval counter 176 begins counting when the target identification data key is transmitted, and terminates counting when the data packet is received from the wireless counter 102, as described above. The signal processor 194 calculates a transmission interval from the transmission interval period, the propagation delay and the loop-back counter period, in the manner described above. However, to account for variations in calculated transmission interval resulting from the orientation of the receiving antenna sector 156 relative to the wireless target 102, the signal processor 194 subtracts, from the calculated transmission interval, the phase delay of the received data packet converted to a time delay. Preferably, the system controller 186 commands the RF transmitter 168 to initiate communication with the wireless target 102 over a number of different frequencies, and the signal processor 194 determines the actual transmission interval from a statistical analysis of the calculated transmission intervals.

In accordance with a third transmission interval determining method, the system controller 186 commands the RF transmitter 168 to transmit a periodic signal to the wireless target 102, encoded with a target identification data key, at a defined frequency. The wireless target 102 responds by transmitting a similar periodic signal to the locating station 104 at the same frequency. Upon receipt of the periodic signal, the system controller 186 adjust the transmit frequency until the phase detector 180 informs the system controller 186 that the transmitted and received periodic signals are in phase. At this point, the transmit frequency is inversely proportional to the range of the wireless target 102. Preferably, the system controller 186 commands the RF transmitter 168 to initiate communication with the wireless target 102 over a number of different frequencies, each being a multiple of the lowest phase-locked frequency, and the signal processor 194 determines the range from a statistical analysis of the phase-locked frequencies (or corresponding periods).

Figure 8:
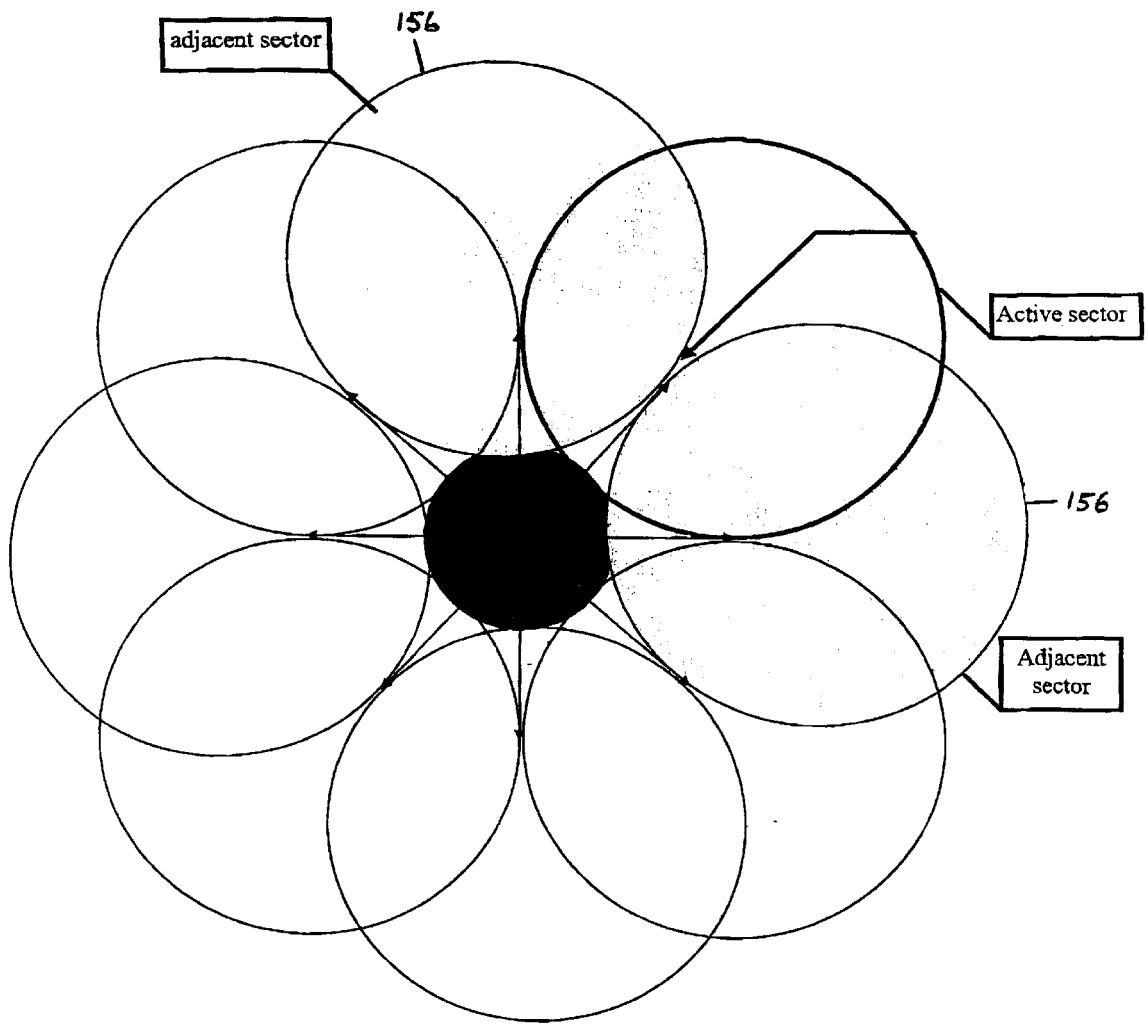
FIG. 8 is a schematic diagram of an antenna beam pattern used for detecting the angular direction of the wireless target relative to the wireless locating station.

In accordance with a first transmission angle determining method, the directional antenna 136 comprises a multi-segmented antenna array, such as the monopole array 136, and the signal processor 194 and the directional antenna controller 196 adjust the lobe width of each antenna sector 156 of the monopole array 136 until the signal measured at the antenna sectors 156 (referred to herein as "adjacent sectors") on opposite sides of a particular antenna sector 156 (referred to herein as the "active sector") have the same magnitude and phase. As shown in FIG. 8, with this method the lobe edges of the adjacent sectors intersect at the 0 dB point of the active sector 156, and the point of intersection of the lobes, together with the position of the centre antenna element 146, identify the transmission angle of the data packet. Preferably, the system controller 186 commands the RF transmitter 168 to initiate communication with the wireless target 102 over a number of different frequencies, and the signal processor 194 and the antenna controller 196 determine the 0 dB point from a statistical analysis of the measured magnitude and phase of the adjacent sectors.

In accordance with a second transmission angle determining method, the directional antenna 136 comprises a multi-segmented antenna array, such as the monopole array 136, and the signal processor 194 measures the magnitude of the transmission received at each antenna sector 156. Since the magnitude measured by one of the antenna sectors 156 will be the peak value of all the magnitude measurements taken by the antenna sectors 156, the signal processor 194 linearly interpolates the magnitude information received at two or more antenna sectors adjacent to the peak antenna sector to derive the transmission angle of the data packet. Preferably, the system controller 186 commands the RF transmitter 168 to initiate communication with the wireless target 102 over a number of different frequencies, and the signal processor 194 determines the transmission angle from a statistical analysis of the measured magnitude information.

In accordance with a third transmission angle determining method, the directional antenna 136 comprises a multi-segmented antenna array, such as the monopole array 136, and the target database 188 includes calibration data for each antenna sector 156 for each wireless target 102. The signal processor 194 compares the magnitude and phase information measured at each antenna sector 156, compares the measured information with the calibration data, and then determines the transmission angle from a piece-wise linear interpolation of the measured information with the calibration data. Alternately, in one variation, the signal processor 194 determines the transmission angle from a minimum error best-fit comparison of the measured information with the calibration data. Preferably, the system controller 186 commands the RF transmitter 168 to initiate communication with the wireless target 102 over a number of different frequencies, the target database 188 includes calibration data for each antenna sector 156, and the signal processor 194 determines the transmission angle from a statistical analysis of the measured magnitude information.

In accordance with a fourth method, the directional antenna 136 comprises a multi-segmented antenna array, such as the monopole array 136, and the target database 188 includes calibration data for each antenna sector 156 for each wireless target 102 using a number of different lobe configurations for the antenna sector 156. The system controller 186 commands the monopole array 136 to measure the magnitude and phase information using a number of different configurations for each antenna sector 156. The signal processor 194 compares the magnitude and phase information measured at each antenna sector 156, compares the measured information with the calibration data, and then determines the transmission angle from a piece-wise linear interpolation or a minimum error best-fit comparison of the measured information with the calibration data.

In accordance with a fifth transmission angle determining method, the directional antenna 136 comprises a multi-segmented antenna array, such as the monopole array 136. Since the antenna sector 156 focussed directly at the wireless target 102 will have both the peak amplitude and the minimum phase differential with the system clock of all the measurements taken by the antenna sectors 156, the signal processor 194 derives the transmission angle by comparing the magnitude and phase information at each antenna sector 156 to locate the antenna sector 156 having both the peak amplitude value and the minimum phase differential.

In accordance with a sixth transmission angle determining method, the directional antenna 136 comprises a multi-segmented antenna array, such as the monopole array 136, and the system controller 186 commands the RF transmitter 168 to initiate communication with the wireless target 102 over a number of different frequencies. Since reflections of the signal transmitted from the wireless target 102 will always arrive after the direct path transmission, and since the direct path transmission is synchronized with the locating station 104, the phase of a reflection received by an antenna sector 156 will undergo a phase shift as a function of the change in transmission frequency. Therefore, with the second method, the signal processor 194 analyses the phase information from each antenna sector 156 over the frequency spread, and identifies the transmission angle of the data packet from the phase information over the frequency spread.

In accordance with a seventh transmission angle determining method, the directional antenna 136 comprises a multi-segmented antenna array, such as the monopole array 136, and the system controller 186 commands the RF transmitter 168 to initiate communication with the wireless target 102 over a number of different frequencies. Since the path length differences in the reflected signals will cause variations in signal amplitude with frequency, the signal processor 194 analyses the magnitude information from each antenna sector 156 over the frequency spread, and identifies the transmission angle of the data packet from the magnitude information over the frequency spread.

In operation, tracking of a wireless target 102 is commenced either after the operator of the locating station 104 is contacted directly, or if the user of the wireless target 102 is equipped with a portable wireless identification transmitter which is not within a predetermined maximum range of the wireless target 102. In either case, preferably the locating station 104 begins tracking the wireless target 102 by transmitting to the wireless target 102 a target identification data key identifying the wireless target 102, and a frequency hop code to command the wireless target 102 to communicate with the locating station 104 using the specified frequency hop sequence. Preferably, the locating station 104 also transmits, together with the target identification data key, a PRN code to command the wireless target 102 to communicate with the locating station 104 using the specified direct sequence spread encoding. As discussed above, direct sequence encoding provides the locating station 104 with improved amplitude determination capabilities by reducing the sensitivity of the phase detector 180 and the amplitude detector 182 to narrow band jamming and, accordingly, provides the locating station 104 with improved target locating accuracy. In one variation, the wireless target 102 and the locating station 104 are configured to only operate using a single predetermined frequency hop sequence and/or direct sequence spreading, in which case the locating station 104 does not transmit the frequency hop code and/or PRN code.

The locating station 104 then transmits to the wireless target 102, using the specified frequency hop sequence and the specified direct sequence spread encoding, the target identification data key identifying the wireless target 102, and initiates counting via the interval counter 176. Preferably, the specified frequency hop sequence causes the target identification data key to be transmitted over a plurality of different frequencies as a broad spread spectrum sequence.

Upon receipt of the target identification data key, the wireless target 102 having a wireless identification data code (or wireless alias code) matching the wireless identification data key transmits back to the locating station 104 a data packet which specifies the wireless identification data code (or wireless alias code) and the propagation delay through the wireless target 102. The data packet is transmitted back using the specified frequency hop sequence and the specified direct sequence spread encoding. The locating station 104 then determines the location of the wireless target 102 by calculating the round-trip transmission time and the direction of the transmission from the wireless target 102. Preferably, the locating station 104 uses a plurality of the foregoing transmission time and direction determination methods, including reconfiguring the directional antenna 136, to improve the accuracy of the calculated position. Preferably, the locating station 104 also refers to the noise database 190 and the map database 192 for enhanced tracking resolution. The locating station 104 then compares the location information stored in the target database 188 to determine whether the wireless target 102 has moved.

The foregoing description is intended to be illustrative of the preferred embodiment of the present invention. Those of ordinary skill may envisage certain additions, deletions and/or modifications to the described embodiment, which although not explicitly described herein, do not depart from the spirit or scope of the invention, as defined by the claims appended hereto.

We claim:

1. A wireless locating station for determining a position of a target, the locating station comprising:

a configurable directional antenna for receiving over a communication path a data packet from the target, the data packet including an identification code uniquely associated with the target;

a communication interval processing system in communication with the directional antenna for determining a transmission interval of the transmitted data packet over the communication path;

a direction processing system for determining a transmission angle of the communication path, the direction processing system being in communication with the directional antenna for controlling a configuration of the antenna array for facilitating the transmission angle determining; and a position processing system in communication with the interval processing system and the direction processing system for determining the target position from the identification code, the transmission interval and the transmission angle.

2. The wireless locating station according to claim 1, wherein the direction processing system comprises a phase detector for determining a phase of the received data packet relative to a system clock, and an amplitude detector for determining an amplitude of the received data packet, and the position processing system includes a signal processing system in communication with the phase detector and the amplitude detector for deriving the transmission angle from at least one of the phase and the amplitude.

3. The wireless locating station according to claim 2, wherein the directional antenna includes a plurality of antenna sectors each defining an antenna lobe, each said lobe having a size and a shape, and the position processing system further comprises an antenna controller in communication with the signal processing system for varying at least one of the size and the shape of at least one of the lobes for obtaining a desired tracking resolution.

4. The wireless locating station according to claim 2, wherein the position processing system is configured for facilitating direct sequence spreading communication with the target.

5. The wireless locating station according to claim 2, wherein the signal processing system includes a signal processor for filtering multi-path distortions.

6. The wireless locating station according to claim 2, wherein the signal processing system comprises an ambient noise database identifying ambient noise surrounding the directional antenna, and a signal processor in communication with the ambient noise database for determining the position with reference to the ambient noise.

7. The wireless locating station according to claim 1, further comprising a data transmitter for transmitting to the target a data key uniquely associated with the target, and a data receiver for receiving from the target the data packet in response to the data key and for receiving an indication of a propagation delay through the target, and the communication interval processing system comprises an interval counter in communication with the data transmitter and the data receiver for determining the transmission interval in accordance with the propagation delay indication, a transmit time of the data key, and a receipt time of the data packet.

8. The wireless locating station according to claim 7, wherein the propagation delay indication is provided as a data field of the data packet, and the interval counter is configured for determining the transmission interval in accordance with the propagation delay data field.

9. The wireless locating station according to claim 7, wherein the propagation delay indication is provided as a pulse transmitted from the target, and the interval counter is configured for determining the transmission interval in accordance with a pulse width of the propagation delay pulse.

10. The wireless locating station according to claim 7, wherein the directional antenna comprises a plurality of antenna sectors, at least one of the antenna sectors being configured for transmitting the data key, at least one of the antenna sectors being configured for receiving the data packet.

11. The wireless locating station according to claim 1, wherein the directional antenna includes a centre antenna element in communication with the communication interval processing system and the direction processing system, a plurality of second antenna elements disposed about the centre antenna element, each said second antenna element together with the centre antenna element defining an antenna sector, and a switch matrix coupled to each said antenna sector for altering a configuration of each said antenna sector.

12. The wireless locating station according to claim 11, wherein the directional antenna further comprises a ground plane in proximity to and electrically isolated from the antenna elements, and the switch matrix comprises a plurality of first electronic switches for selectively grounding selected ones of the second antenna elements.

13. The wireless locating station according to claim 12, wherein a first portion of the second antenna elements is disposed at an inner radius about the centre antenna element, a second portion of the second antenna elements is disposed at an outer radius about the centre antenna element, each said antenna sector comprises one of the radially inner second antenna elements, one of the radially outer second antenna elements, and a conductor extending between the one radially inner second antenna element and the one radially outer second antenna element, and the switch matrix comprises a plurality of second electronic switches for selectively connecting together the second antenna elements of one of the antenna sectors with an associated one of the conductors.

14. The wireless locating station according to claim 13, wherein each said antenna sector includes a ground radiator disposed radially outwards from the associated second antenna elements, and the switch matrix comprises a plurality of third electronic switches for selectively grounding a radially innermost end of a selected one of the ground radiators.

15. The wireless locating station according to claim 14, wherein each said ground radiator comprises a plurality of ground radials, each said ground radial having a respective incline angle, each said third electronic switch being associated with a respective one of the ground radials for altering a radiation angle of the directional antenna.

16. A wireless locating station for determining a position of a target, the locating station comprising:

a configurable directional monopole antenna array for receiving over a communication path a data packet from the target, the data packet including an identification code uniquely associated with the target, the antenna array comprising a centre antenna element, a plurality of second antenna elements disposed about the centre antenna element, each said second antenna element together with the centre antenna element defining an antenna sector, and a switch matrix coupled to each said antenna sector for altering a configuration of each said antenna sector;

a communication interval processing system in communication with the centre antenna element for determining a transmission interval of the transmitted data packet over the communication path;

a direction processing system for determining a transmission angle of the communication path, the direction processing system being in communication with the antenna array for controlling a configuration of the antenna array for facilitating the transmission angle determining, the direction processing system including a phase detector in communication with the centre antenna element for determining a phase of the received data packet relative to a system clock, and an amplitude detector in communication with the centre antenna element for determining an amplitude of the received data packet; and a position processing system in communication with the interval processing system and the direction processing system for determining the target position from the identification code, the transmission interval and the transmission angle, the position processing system including a signal processing system in communication with the phase detector and the amplitude detector for deriving the transmission angle from at least one of the phase and the amplitude, and an antenna controller in communication with the signal processing system for varying a configuration of at least one the antenna sectors for obtaining a desired tracking resolution.

17. The wireless locating station according to claim 16, further comprising a data transmitter for transmitting to the target a data key uniquely associated with the target, and a data receiver for receiving from the target the data packet in response to the data key and for receiving an indication of a propagation delay through the target, and the communication interval processing system comprises an interval counter in communication with the data transmitter and the data receiver for determining the transmission interval in accordance with the propagation delay indication, a transmit time of the data key, and a receipt time of the data packet.

18. The wireless locating station according to claim 17, wherein each said antenna sector includes a ground radiator disposed radially outwards from the associated second antenna elements, and the switch matrix comprises aplurality of electronic switches for selectively grounding a radially innermost end of a selected one of the ground radiators for altering a radiation angle of the antenna array.

* * * * *